Patented Feb. 26, 1929.

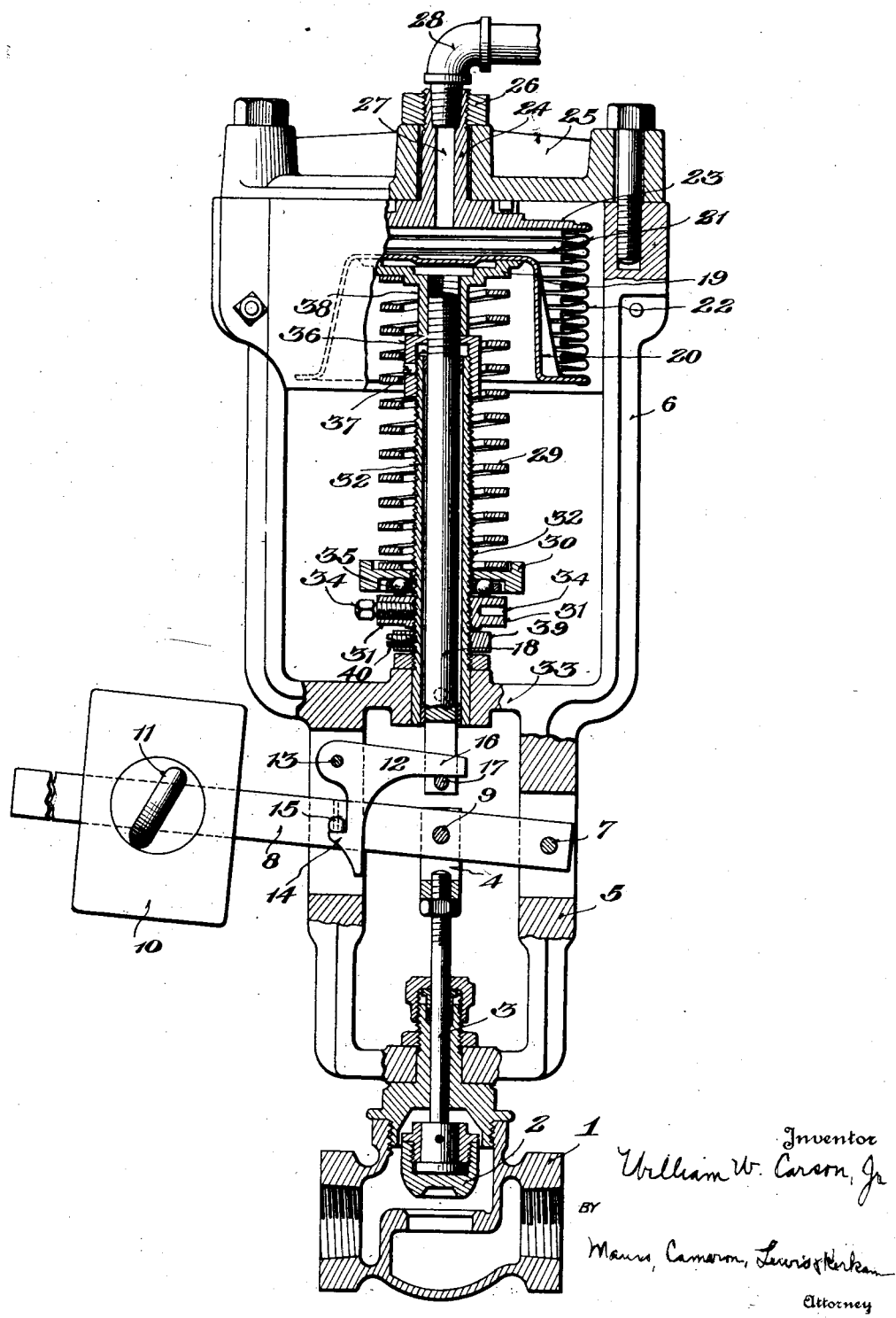

1,703,813

UNITED STATES PATENT OFFICE.

WILLIAM W. CARSON, JR., OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

SAFETY DEVICE.

Application filed July 10, 1924. Serial No. 725,285.

This invention relates to safety devices and, while capable of a variety of uses, is of particular utility when employed with burners using a liquid fuel.

It is customary to supply burners employing a liquid fuel with fluid under pressure, such as air, to atomize the fuel or to assist in supporting combustion or both. If the flow of fluid under pressure stops for any reason, such for instance as may occur if the motor of the air compressor stops, the continuing flow of the fuel will cause the flooding of the burner, with the resultant danger of fire or even explosion. To overcome this difficulty it has been proposed to connect a valve in the fuel line directly to a diaphragm subjected to the pressure of the air or other fluid flowing to the burner, so that the diaphragm will hold the fuel valve open so long as the fluid pressure is maintained but permit the fuel valve to close when there is a predetermined drop in said pressure. Devices of this type, however, possess the grave disadvantage that the fuel valve will be opened immediately that the fluid pressure is restored, so that unless the attendant is present to light the burner immediately, there is a likelihood of flooding the burner with the resultant danger of fire or explosion. To avoid this latter difficulty, it has been proposed to provide the fuel valve with a weighted lever and to provide the diaphragm subjected to the fluid pressure with a detent to cooperate with said lever and hold the fuel valve open while the fluid pressure is maintained, the fuel valve being released by the diaphragm-actuated detent upon a predetermined decrease in said pressure, in which case the fuel valve can be opened only by manual resetting of the device. But devices of this latter character as heretofore proposed also possess serious defects and disadvantages among the more important of which may be noted the difficulty of resetting the weighted lever against the pressure on the diaphragm when the fluid pressure has been restored, the short life of the device under the rough usage and operating conditions to which such devices are subjected, the complexity and costliness of construction employed, etc.

It is an object of this invention to provide an improved safety device of the type under consideration wherein the fuel valve is released by the actuation of a detent upon a predetermined decrease in pressure, and wherein the fuel valve can be reopened only by a manual resetting of the device, which avoids the defects and difficulties of structures of this character heretofore proposed; which permits of resetting of the device without moving any of the parts against the pressure of the air or other fluid; and which is capable of withstanding for long periods the rough usage and operating conditions to which such devices are subjected.

A further object of this invention is to provide a safety device of the type under consideration which may be readily adjusted to conform with the fluid pressure to be employed under different conditions, which is inexpensive to manufacture and easy to install, and which is simple in construction and efficient in operation.

Further objects will appear as the description of the invention proceeds. The invention is capable of receiving a variety of mechanical expressions, one of which is shown on the accompanying drawing, but it is to be expressly understood that the drawing is for purposes of illustration only and is not to be construed as a definition of the limits of the invention, reference being had to the appended claims for that purpose.

The accompanying drawing shows an elevation, partly in section, of a safety device for liquid-fuel burners embodying the present invention.

In the form shown, 1 designates a valve housing of any suitable construction adapted to be interposed in a line for conveying fuel to a burner. Within this valve housing is a valve 2 of any suitable construction provided with a valve stem 3 which carries a clevis 4, attached thereto in any suitable way.

Mounted on or adjacent to said valve housing in any suitable way is a frame 5 which, at its upper end 6, is enlarged to receive the pressure responsive device to be described. Fulcrumed on said frame at 7 is a lever 8 which projects through the slot of the clevis 4 and is pivotally attached to said clevis as by a pin 9. Said lever projects outwardly from the frame 5 to any suitable extent and on its outer end carries an adjustable weight 10 which may be retained against displacement on the lever 8 in any suitable way as by a set screw 11. The weight 10 tends to swing the lever 8 about its fulcrum 7 and thereby, through the connection of said lever to the clevis 4 and valve stem 3, tends to move the valve 2 to closed position. While a weighted lever has been shown for closing the valve, however, it is to be expressly understood that a spring or any other suitable device may be employed instead.

To retain the valve 2 in open position a detent 12 is pivoted on the frame at 13 and has one end formed to provide a latch 14 for cooperation with a pin 15 projecting from the lever 8. The opposite end 16 of the detent 12 is designed to cooperate with a pin 17 on a stem 18 which, in the form shown, is slotted at its lower end to receive the end 16 of said detent and to provide with the pin 17 a lost motion connection between the stem 18 and said detent.

Said stem 18 is connected in any suitable way to a plate 19 which is suitably attached to or contacts with the movable end wall 20 of an expansible and collapsible chamber 21. Said expansible and collapsible chamber may be of any suitable construction but is preferably composed of a flexible corrugated tubular wall 22 of any suitable material, such as a resilient metal, closed at its opposite ends by rigid end walls 20 and 23. To reduce the volume of said chamber 21 the end wall 20 is preferably made reentrant as illustrated. The opposite end wall 23 of said chamber is held in fixed position in any suitable way, being shown as provided with a hub 24 which projects through an aperture in the removable cap 25 of the upper portion of the frame and fixedly clamped against said cap 25 by a nut 26 threaded onto the projecting end of said hub. The interior of said chamber 21 is suitably connected with the system for supplying air or other fluid to the burner, as by a passage 27 in the hub 24 and elbow 28.

To predetermine the pressure which must exist in the chamber 21 in order that said chamber shall be expanded, means are provided for opposing the expansion of said chamber and, in order to provide for different conditions of operation, said means is preferably made adjustable. While any suitable means for opposing expansion of the chamber 21 may be employed, the form illustrated includes a coil spring 29 which surrounds the stem 18 and bears upon and is centered by the plate 19 connected to or in contact with the movable end wall 20 of said chamber. The opposite end of said spring 29 bears against a plate 30 which constitutes an abutment for said spring. To provide for variably tensioning said spring 29, said plate 30 cooperates with a nut 31 threaded on to an elongated sleeve 32 which surrounds and preferably forms a guide for the stem 18, said sleeve 32 being mounted in any suitable way in a crossbrace 33 of the frame 5, 6. The nut 31 is preferably provided with spanner wrench holes 34, and may be locked in adjusted position by a set screw 34′. To reduce friction between said nut and plate 30 a ball-bearing 35 may be interposed as illustrated. The upper end of said sleeve 32 may, if desired, constitute a stop for the expansion of the chamber 21, or as illustrated, said sleeve may be provided with an adjustable extension 36, which may be retained in adjusted position by a set screw 37, designed to cooperate with the threaded nipple 38 on the plate 19 which receives the end of the stem 18 and limit the outward or expansive movement of the end wall 20. A set collar 39 locked in adjusted position by a set screw 40, may also be provided to prevent nut 31 from being locked so far down sleeve 32 that the tension of spring 29 is insufficient to close the valve 2 upon failure of pressure in chamber 21.

When the fuel valve is open and air or other fluid under pressure is being properly supplied to the burner, the parts are in the position illustrated on the drawing. The pressure in the air line communicated to the interior of the chamber 21 holds the latter chamber in expanded position, against the tension of the spring 29, and the detent 12 has its latch 14 in engagement with the pin 15 on the weighted lever 8 to hold the valve 2 in open position. In the event of failure of the air supply, or in the event that the pressure of the air drops below the predetermined tension of the spring 29, said spring 29 collapses the chamber 21 and moves the plate 19 to pull the stem 18 upwardly as viewed on the drawing. This movement of the stem 18 causes the pin 17 carried thereby to actuate the detent 12 and withdraw the latch 14 from engagement with the pin 15, whereupon the lever 8 falls under the influence of its weight 10, moving the valve stem 3 to close the valve 2. When the pressure of the air is restored to the chamber 21, said chamber expands until the nipple 38 on the movable plate 19, connected to or in contact with the movable end wall 20 of said chamber, engages the threaded stem 32 or its adjustable extension 36, and stem 18 is thereby moved downwardly as viewed in the drawing. This movement of the stem 18, however, is incapable of opening the valve 2. To open the valve 2 the weighted lever 8 must be swung manually around its fulcrum 7, and may then be locked in open position by the detent 12 provided the air pressure has previously expanded the chamber 21 so that the detent 12 may engage its latch 14 with the pin 15. This movement of the weighted lever 8 to open the valve is not opposed by the pressure in the collapsible and expansible chamber 21, since the lost motion connection between the detent and the stem provides for movement of the valve, its closing means, and the detent, all without movement of chamber 21 and stem 18. When the latch 14 of said detent 12 is engaged with the pin 15, however, the end 16 of said detent is in cooperative relation with the pin 17, so that the detent 12 will be promptly operated to release the weighted lever 8 upon the failure of or a predetermined decrease in the pressure acting on the movable end wall 20 of the expansible and collapsible chamber 21.

It will therefore be perceived that a safety device has been provided which avoids the defects and difficulties of the devices of this type heretofore suggested. The fuel valve is promptly closed upon the failure of or a predetermined decrease of pressure in the air supply, and the return of the air pressure will not reopen the fuel valve in the absence of a manual resetting, while this manual resetting of the device is accomplished without moving any of the parts against the pressure of the air or other fluid. Means have also been provided whereby the device may be easily set so as to be operated upon any desired drop in the pressure. Moreover, the device is simple and rugged in construction so that it occupies little space, is easy to install and adjust, is inexpensive to manufacture and maintain, is durable against the rough usage and operating conditions to which such devices are subjected, and is certain and efficient in operation.

While the invention has been described as embodied in a device for operating a fuel valve upon failure of or a predetermined decrease of pressure in the air supply, it is to be expressly understood that the invention is not limited thereto, as it is capable of a wide variety of uses wherein the operation of an element is to be determined by variations of pressure. Also, while the embodiment of the invention illustrated on the drawing has been described with considerable particularity, it is expressly understood that the invention is not restricted thereto, as the same is capable of receiving a variety of mechanical expressions, some of which will now readily suggest themselves to those skilled in the art, while changes may be made in the detail of construction, arrangement and proportion of parts, and certain features used without other features, without departing from the spirit of this invention Reference is therefore to be had to the claims hereto appended for a definition of the limits of said invention.

What is claimed is:—

1. In a safety device for burners, in combination with a fuel valve, means normally tending to close said valve, a detent for holding said valve in open position, a single expansible and collapsible vessel alined with said valve and having connections whereby said vessel is subjected to a source of pressure, a stem extending axially from said vessel toward said valve and having means cooperating with said detent whereby said detent is actuated to release said valve upon a predetermined decrease of the pressure acting on said vessel, permitting said detent to be reset only when pressure is restored at said vessel and having a lost motion connection with said detent whereby said detent may be reset without movement of said stem, and a spring concentric with said stem and normally tending to urge said stem in a direction to trip said detent.

2. In a safety device for burners, in combination with a fuel valve, means normally tending to close said valve, a detent for holding said valve in open position, an expansible and collapsible vessel having connections whereby said vessel is subjected to a source of pressure, a stem extending from said vessel and having means cooperating with said detent whereby said detent is actuated to release said valve upon a predetermined decrease of the pressure acting on said vessel, permitting said detent to be reset only when pressure is restored at said vessel, a guide for said stem, a spring encircling the guide and normally tending to collapse the vessel and trip the detent, an abutment on said guide cooperating with said spring and adjustable to regulate the pressure at which the detent will be tripped, and a stop for said adjustable abutment adapted to be locked on said guide in position to prevent such a loose adjustment of the spring that it might fail to collapse the vessel and trip the detent.

3. In a safety device for burners, in combination with a fuel valve, means normally tending to close said valve, a detent for holding said valve in open position, an expansible and collapsible vessel alined with said valve and having connections whereby said vessel is subjected to a source of pressure, a stem extending axially from said vessel toward said valve and having means cooperating with said detent whereby said detent is actuated to release said valve upon a predetermined decrease of the pressure acting on said vessel, permitting said detent to be reset only when pressure is restored at said vessel and having a lost motion connection with said detent whereby said detent may be reset without movement of said stem, a spring concentric with said stem and normally tending to urge said stem in a direction to trip said detent, a tubular guide for said stem, and means on said guide for adjusting the tension of said spring.

In testimony whereof I have signed this specification.

WILLIAM W. CARSON, Jr.